(12) United States Patent
Li et al.

(10) Patent No.: US 8,358,280 B2
(45) Date of Patent: Jan. 22, 2013

(54) ELECTRONIC DEVICE CAPABLE OF SHOWING PAGE FLIP EFFECT AND METHOD THEREOF

(75) Inventors: Xiao-Guang Li, Shenzhen (CN); Hsiao-Chung Chou, Taipei Hsien (TW); Kuan-Hong Hsieh, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 955 days.

(21) Appl. No.: 12/351,859

(22) Filed: Jan. 12, 2009

(65) Prior Publication Data
US 2009/0219248 A1 Sep. 3, 2009

(30) Foreign Application Priority Data
Feb. 29, 2008 (CN) .......................... 2008 1 0065461

(51) Int. Cl.
*G06F 3/041* (2006.01)
(52) U.S. Cl. .......................... 345/173; 715/702; 715/776
(58) Field of Classification Search .................... None
See application file for complete search history.

(56) References Cited

U.S. PATENT DOCUMENTS

| | | | | |
|---|---|---|---|---|
| 5,463,725 A * | 10/1995 | Henckel et al. | ............... | 715/776 |
| 5,764,227 A * | 6/1998 | Ishimine | .................... | 715/807 |
| 5,900,876 A * | 5/1999 | Yagita et al. | ................... | 715/776 |
| 6,407,757 B1 * | 6/2002 | Ho | ................................. | 715/776 |
| 6,628,310 B1 * | 9/2003 | Hiura et al. | .................... | 715/776 |
| 7,081,882 B2 * | 7/2006 | Sowden et al. | ................ | 345/156 |
| 7,136,061 B2 * | 11/2006 | Cordner | ......................... | 345/419 |
| 7,898,541 B2 * | 3/2011 | Hong et al. | ..................... | 345/473 |
| 2001/0039552 A1 * | 11/2001 | Killi et al. | ....................... | 707/500 |
| 2007/0226652 A1 * | 9/2007 | Kikuchi et al. | ................ | 715/836 |
| 2009/0066701 A1 * | 3/2009 | Kao et al. | ........................ | 345/473 |
| 2009/0177385 A1 * | 7/2009 | Matas et al. | .................... | 701/209 |

FOREIGN PATENT DOCUMENTS

| | | |
|---|---|---|
| JP | 2-144768 | 6/1990 |
| TW | 200609843 | 3/2006 |
| TW | 200712994 | 4/2007 |

\* cited by examiner

*Primary Examiner* — Dismery Mercedes
(74) *Attorney, Agent, or Firm* — Altis Law Group, Inc.

(57) ABSTRACT

A method for showing page flip effect when use electronic device enjoy electronic documents, including: when receiving a flip-page instruction, obtain a parameter from a parameter table from a storage unit, the parameter table contains several parameters, each parameter include a first group of coordinates, a content of a flip-page figure and a second group of coordinates; determining a target page according to the flip-page instruction; producing the flip-page figure of the current page according to the first group coordinates and the content; covering a second area of the current page determined by the second group of coordinates with a second area of the target page determined by the second group of coordinates to form a combined page; displaying the combined page. Present invention also provides an electronic device capable of showing a page flip effect.

13 Claims, 11 Drawing Sheets

| Parameter | A first group of coordinates | Image information | A second group of coordinates |
|---|---|---|---|
| parameter 1 | { $(X_{11}, Y_{11})$, $(X_{12}, Y_{12})$, $(X_{13}, Y_{13})$, $(X_{14}, Y14)$ } | Text/image (e.g., watermark)/blank | { $(X'_{11}, Y'_{11})$, $(X'_{12}, Y'_{12})$, $(X'_{13}, Y'_{13})$, $(X'_{14}, Y'_{14})$ } |
| parameter 2 | { $(X_{21}, Y_{21})$, $(X_{22}, Y_{22})$, $(X_{23}, Y_{23})$, $(X_{24}, Y_{24})$ } | Text/image (e.g., watermark)/blank | { $(X'_{21}, Y'_{21})$, $(X'_{22}, Y'_{22})$, $(X'_{23}, Y'_{23})$, $(X'_{24}, Y'_{24})$ } |
| parameter 3 | { $(X_{31}, Y_{31})$, $(X_{32}, Y_{32})$, $(X_{33}, Y_{33})$, $(X_{34}, Y_{34})$ } | Text/image (e.g., watermark)/blank | { $(X'_{31}, Y'_{31})$, $(X'_{32}, Y'_{32})$, $(X'_{33}, Y'_{33})$, $(X'_{34}, Y'_{34})$ } |
| ...... | ...... | ...... | ...... |
| parameter n | { $(X_{N1}, Y_{N1})$, $(X_{N2}, Y_{N2})$, $(X_{N3}, Y_{N3})$, $(X_{N4}, Y_{N4})$ } | Text/image (e.g., watermark)/blank | { $(X'_{N1}, Y'_{N1})$, $(X'_{N2}, Y'_{N2})$, $(X'_{N3}, Y'_{N3})$, $(X'_{N4}, Y'_{N4})$ } |

FIG. 2

ELECTRONIC DEVICE CAPABLE OF SHOWING PAGE FLIP EFFECT AND METHOD THEREOF

BACKGROUND

1. Related Applications

This application is related to a co-pending U.S. patent application filed concurrently herewith and is entitled "ELECTRONIC DEVICE CAPABLE OF SHOWING PAGE FLIP EFFECT AND METHOD THEREOF," which is incorporated herein in its entirety by reference.

2. Technical Field

The disclosure relates to electronic devices and, particularly, to an electronic device capable of showing page flip effect and method thereof.

3. General Background

Nowadays, many electronic devices, e.g., mobile phones, digital photo frames, electronic readers (e-reader), are capable of storing and displaying electronic documents (e.g., digital images, digital texts, etc). Usually, readability of these electronic devices deviates greatly from real paper print. For example, when people flip a page of an electronic document on these electronic devices, the page is directly changed without any visual effect simulating the turning of a page; as a result, it is difficult for people to get the feeling of reading real paper.

In order to resolve this problem, a software capable of generating a page flip effect when flipping through the pages of the digital document is introduced. However, a powerful processing unit is needed to run the software, which results in increase of the cost of these electronic devices.

Therefore, it is necessary to provide an electronic device and a method to overcome the above-identified deficiencies.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

FIG. 2 is a schematic diagram showing a parameter table in accordance with the exemplary embodiment.

DETAILED DESCRIPTION OF THE EMBODIMENTS

Figure 1:
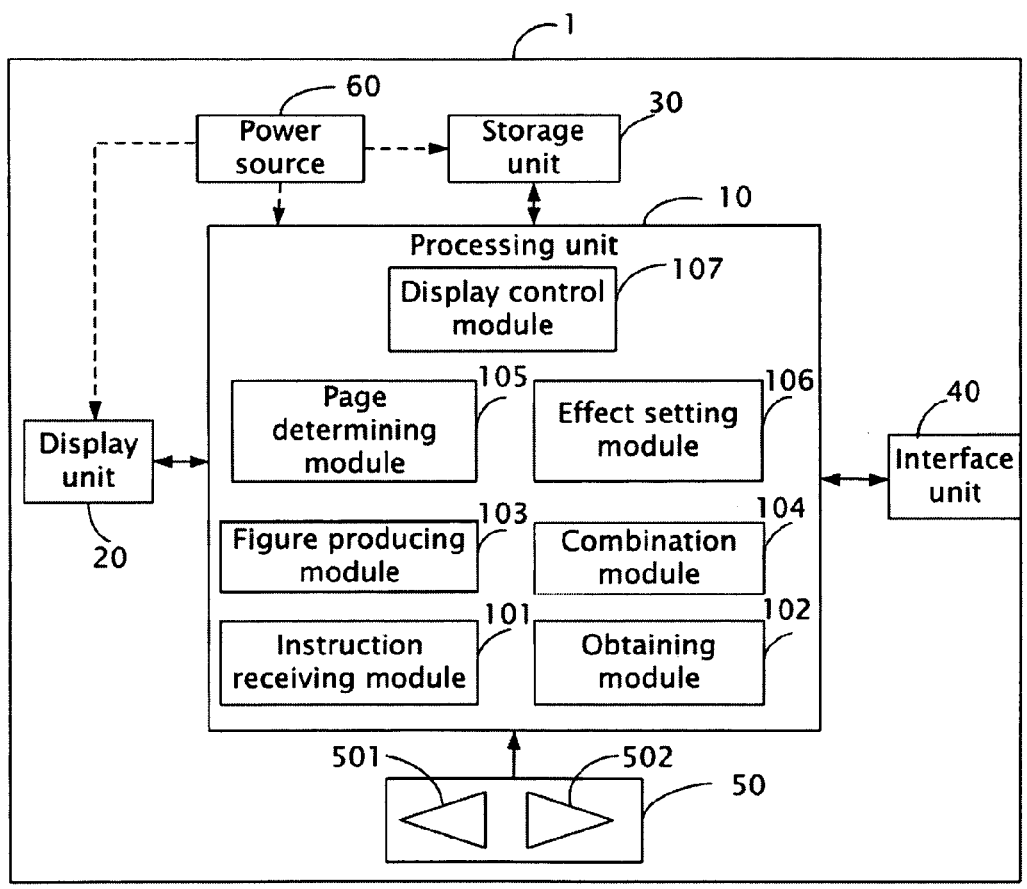
FIG. 1 is a block diagram of an electronic device capable of showing information with a page flip effect in accordance with an exemplary embodiment.

Referring to FIG. 1, an electronic device 1, capable of showing information with a page flip effect in accordance with an exemplary embodiment, includes a processing unit 10, a display unit 20, a storage unit 30, an interface unit 40, an input unit 50, and a power source 60. The electronic device 1 can be an e-reader, a mobile phone, or a digital photo frame, etc.

The interface unit 40 is configured to connect to an external electronic device (not shown). The external device can be a storage card (for example, a secure digital (SD) card, a compact flash (CF) card) or another electronic device (for example, a digital camera, a mobile phone, or a computer).

The input unit 50 is configured to generate instructions in response to user operations. The input unit 50 can be an input key (button), a knob, or the like. In the exemplary embodiment, the input unit 50 is a keyboard that includes a page up key 501, a page down key 502, and other functional keys (not shown). The page up key 501 is configured to produce a previous page instruction and the page down key 502 is configured to produce a next page instruction. The power source 60 is configured to provide power to elements of the electronic device 1, such as the processing unit 10 and the display unit 20.

The storage unit 30 is configured to store files. The display unit 20 is configured to display the files. The files may include, but are not limited to, audio, video, digital image, and text files. In the exemplary embodiment, the storage unit 30 is a built-in storage unit, such as a flash memory or a micro drive. The storage unit 30 also stores a parameter table that is described below.

Referring to FIG. 2, the parameter table includes a plurality of parameters indicated as parameter 1 to parameter n, n being some whole number greater than zero. Each of the parameters includes a first group of coordinates, content of a flip-page figure, and a second group of coordinates. The first group of coordinates is used to determine a first area of a page, and the second group of coordinates is used to determine a second area of a page. In the exemplary embodiment, a first area of a combined page is an area displaying the flip-page figure which represents one of the page flip effects, such as a dog-ear representing a page turnover effect, wherein the dog-ear can be a triangle, a quadrangle, a pentagon etc. A second area of the combined page is an area displaying a part of a target page when flipping page(s) (hereinafter, target page area). The content of the flip-page figures include, but is not limited to, image, text and blank.

Figure 4A:
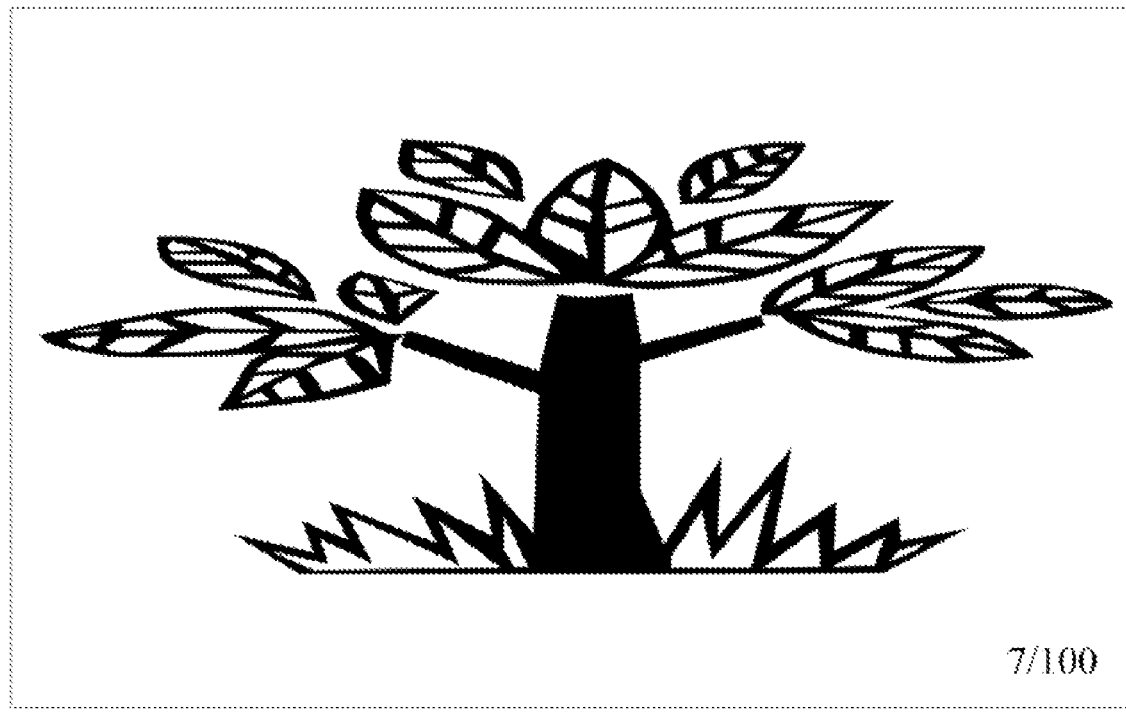
FIGS. 4A-4F are a series of schematic diagrams illustrating the full process of flipping a page in accordance with the exemplary embodiment.
Figure 4B:
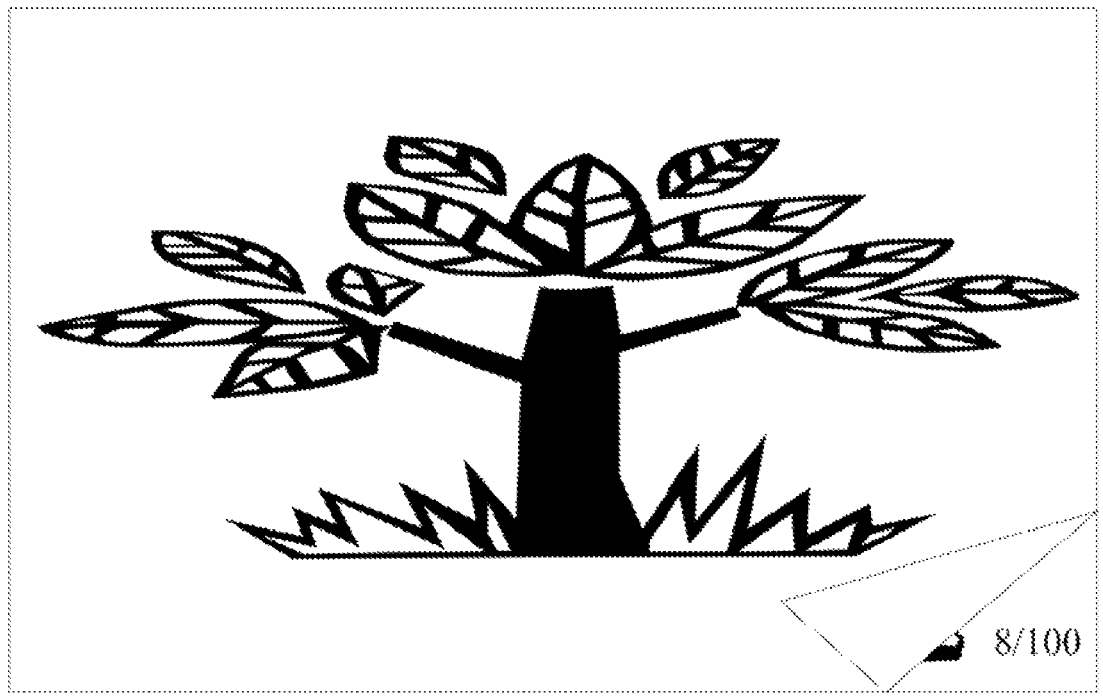
Figure 4C:
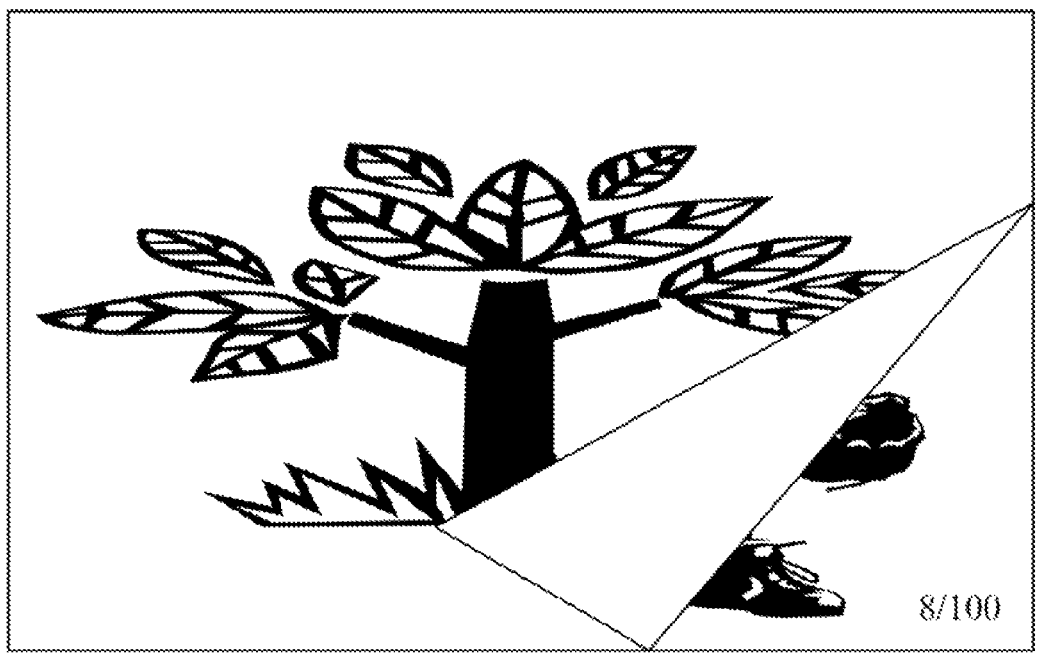
Figure 4D:
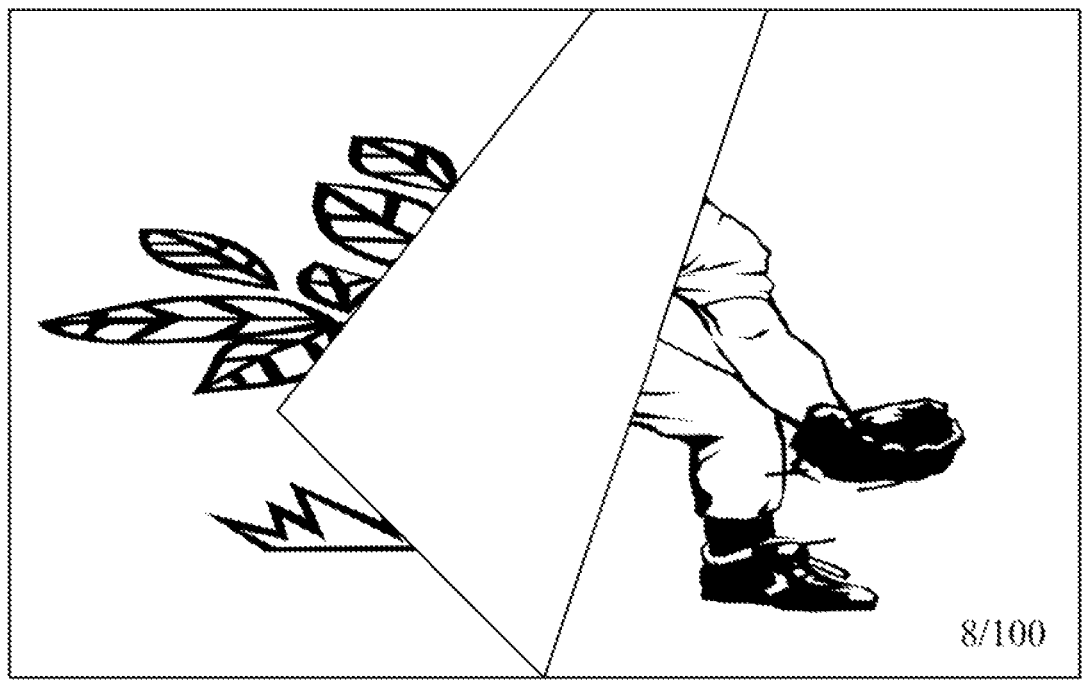
Figure 4E:
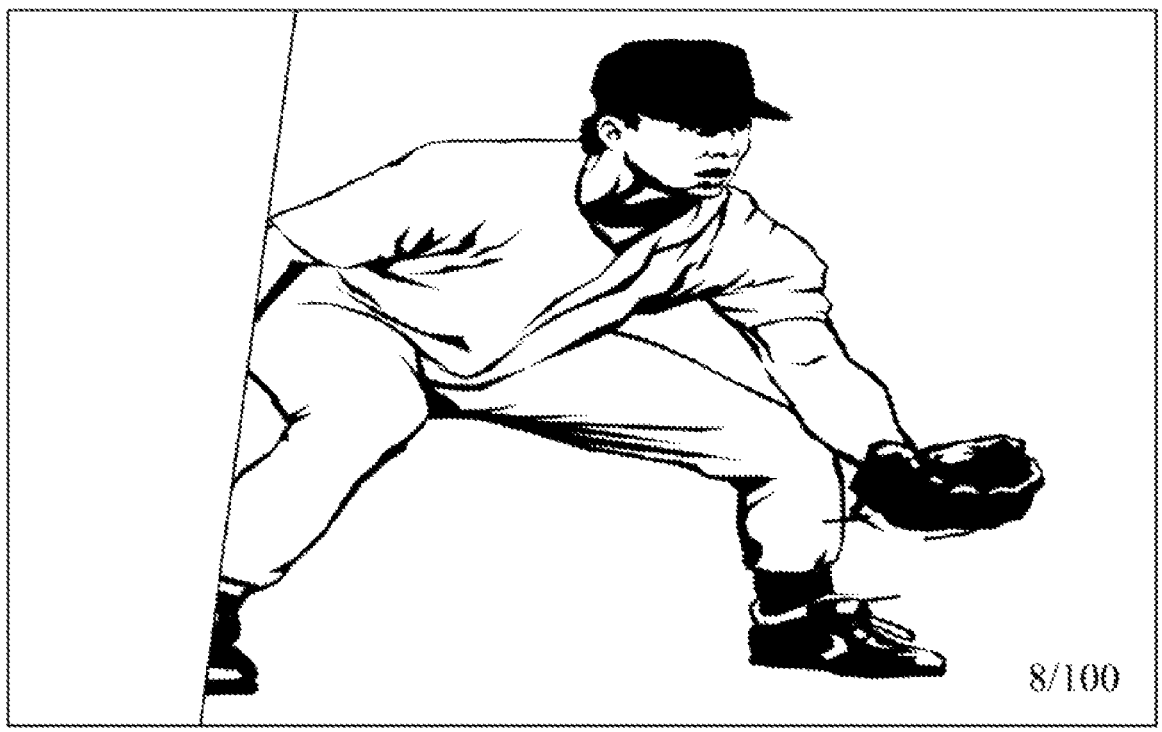
Figure 4F:
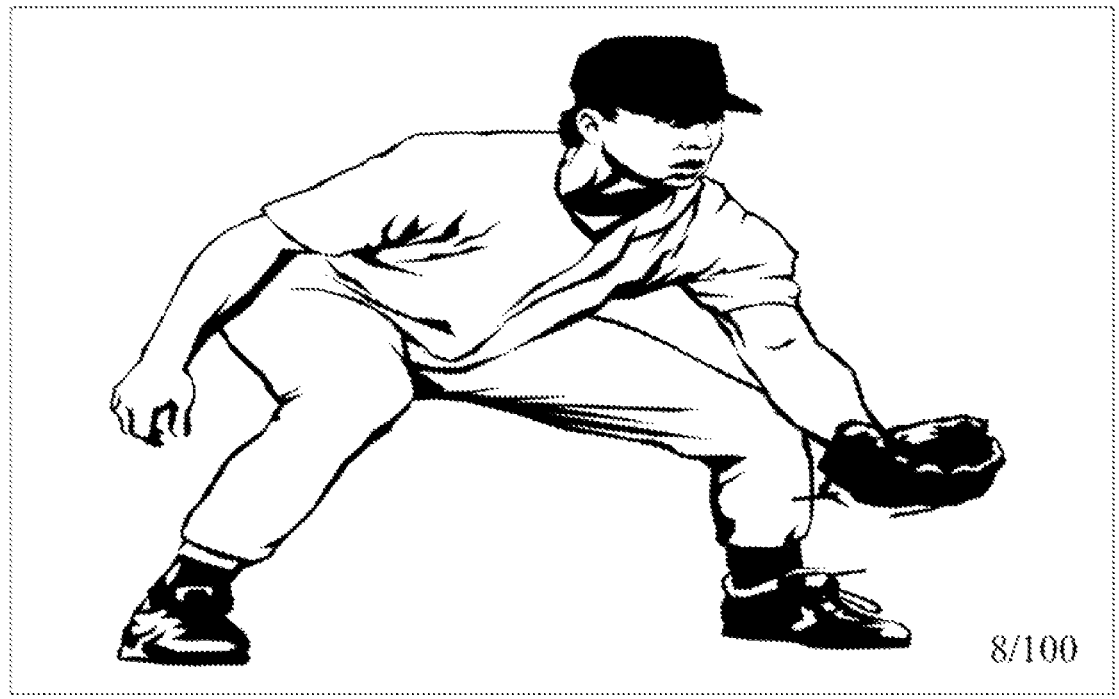

Each of the parameters is pre-numbered in a full page-flipping process and each is associated with one step of the process of completely flipping a page. Corresponding to the parameters, a series of combined pages as shown in FIGS. 4A-4F are formed in sequence. FIG. 4A shows a current image without page flip effect. Then, a first combined page as shown in FIG. 4B is formed according to parameter 1, and a second combined page as shown in FIG. 4C is formed according to parameter 2. The process goes on as illustrated in FIGS. 4D-4F until all the parameters have been processed. The series of combined pages exhibit the page flip effect as if flipping a physical page from the current page to the next page.

Figure 3:
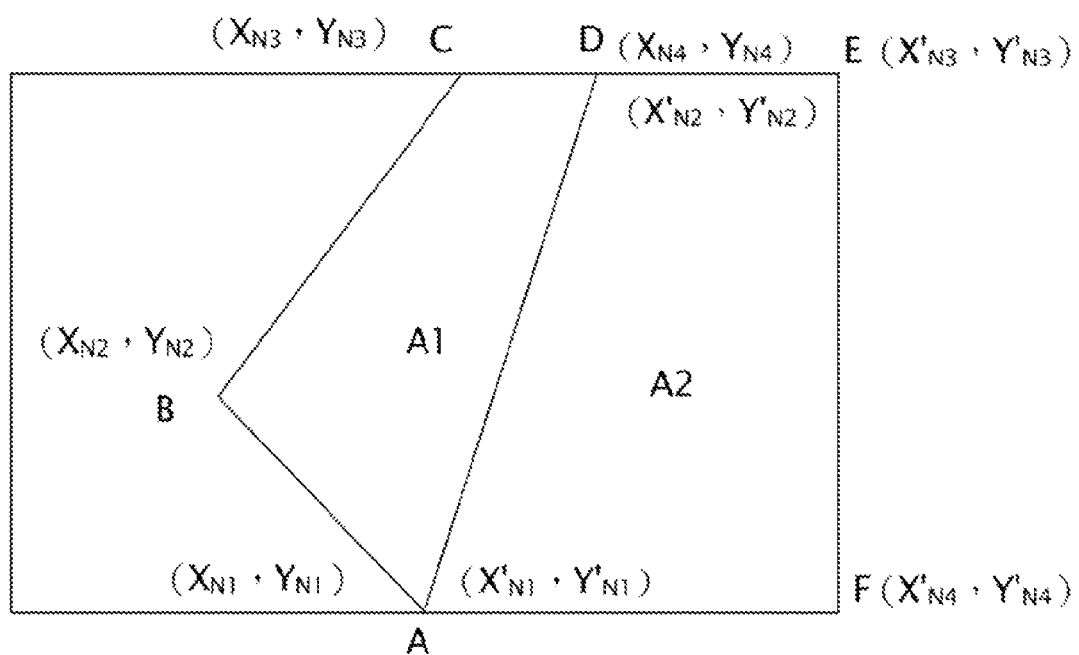
FIG. 3 is a schematic diagram illustrating areas determined by coordinates in accordance with the exemplary embodiment.

Referring to FIGS. 2 and 3, the first group of coordinates of parameter n, namely $(X_{N1}, Y_{N1})$, $(X_{N2}, Y_{N2})$, $(X_{N3}, Y_{N3})$, $(X_{N4}, Y_{N4})$ (N=1, 2 . . . ) respectively correspond to positioning points A, B, C, and D, and these four points determines four straight line to form a first area A1, namely the area of displaying the flip-page figure of the combined page. The second group of coordinates of parameter n, namely $(X'_{N1}, Y'_{N1})$, $(X'_{N2}, Y'_{N2})$, $(X'_{N3}, Y'_{N3})$, $(X'_{N4}, Y'_{N4})$ (N=1, 2 . . . ) respectively correspond to points A, D, E, and F, and these four points A, D, E, and F determine four straight lines to form a second area A2, namely the area of displaying a part of the target page of the combined page. A number of the coordinates in the first group and the second group can be changed according to user's preferences. Accordingly, shapes of the first area A1 and the second area A2 would be changed in response to the number of the coordinates, for example, the shapes can be in the form of triangle, quadrangle, or pentagon, etc.

The processing unit 10 includes an instruction receiving module 101, an obtaining module 102, a figure producing module 103, an combination module 104, a page determining module 105, an effect setting module 106, and a display control module 107. Functions of the above modules will be described in combination with FIGS. 4A-4F below.

Referring again to FIGS. 4A-4F, when a user views an electronic documents (e.g., a digital text file, or digital image) through the electronic device 1, the user may input a flip-page instruction through operating the input unit 50. The instruction receiving module 101 is configured to receive the flip-page instruction generated by the page up key 501 or the page down key 502. The page determining module 105 is configured to determine the target page according to the flip-page instruction, namely if the flip-page instruction is the previous page instruction generated by the page up key 501, then the page determining module 105 determines the target page is the previous page, if the flip-page instruction is the next page instruction generated by the page down key 502, the page determining module 105 determines the target page is the next page.

For example, if the current page displayed on the display unit 20 is page 7/100 as shown in FIG. 4A, wherein 100 represents a total page number of a current text/album and 7 represents the current page. Therefore, if the flip-page instruction is generated by the page down key 502, the page determining module 105 determines the target page is page 8. The obtaining module 102 obtains a first parameter from the parameter table. The figure producing module 103 produces the flip-page figure on the first area of the current page according to the first group of coordinates and the content of the flip-page figure. In detail, the figure producing module 103 determines the positioning points of the first area of the current page according to the first group of coordinates, and obtains the area of displaying the flip-page figure by connecting every two adjacent positioning points, and adds the content to the obtained area, thus forming the flip-page figure.

The combination module 104 determines a second area of the current page (e.g., 7) and a second area of the next page (e.g., 8) according to the second group of coordinates respectively. The combination module 104 covers the determined second area of the current page with the determined second area of the next page to obtain a combined page as shown in FIG. 4B.

The display control module 107 controls the display unit 20 to display the first combined page after the first combined page is combined by the figure producing module 103 and the combination module 104. Because the first area of the combined page is the dog-ear, the second area of the combined page is the image of the next page (e.g., 8), and the other areas of the combined page are of the image of the current page (e.g., 7), then, the first combined page shows the flipping effect that page 7 is turned over at a corner of the page.

After combining and displaying the first combined page, the obtaining module 102, the figure producing module 103, the combination module 104, and the display control module 107 repeats obtaining, producing, covering, and displaying processes described above every predetermine time interval, and the display unit 20 accordingly displays a second combined page as shown in FIG. 4C, a third combined page as shown in FIG. 4D, etc, until the target page (i.e., page 8) is full displayed on the display unit 20 as that shown in FIG. 4F. That is, after the display unit 20 displays one combined page, the obtaining module 102 determines whether there is another parameter to be processed. If yes, the obtaining module 102, the figure producing module 103, the combination module 104, and the display control module 107 repeats the obtaining, producing, covering, and displaying processes described above. If no, the display control module 107 controls the display unit 20 to display the whole next page as shown in FIG. 4F. By using the series of combined pages in sequence as shown in FIG. 4A-FIG. 4F, the page flip effect has the appearance of a physical page being turned.

Before the user operates the electronic device 1 to enjoy electronic documents, the user can set flipping effect information through the input unit 50. In detail, the effect setting module 106 sets the flipping effect information in response to setting operations on the input unit 50. The flipping effect information include but are not limited to, the content of the flip-page figure, the numbers of the parameters to be used in the process of completely flipping a page, and the predetermined time interval of obtaining each parameter and displaying each combined page. The content of the flip-page figure can be, but is not limited to, image (e.g., watermark), text, and blank. The flipping effect information further includes the number of coordinates associated with each parameter.

The number of the parameters is a number of the parameters obtained by the obtaining module 102 in the process of completely flipping a page. For example, if the number of the parameters is set as five, then the obtaining module 102 would obtain five parameters from the parameter table, and the number of the parameter is equal to the number of the combined pages.

Figure 5:
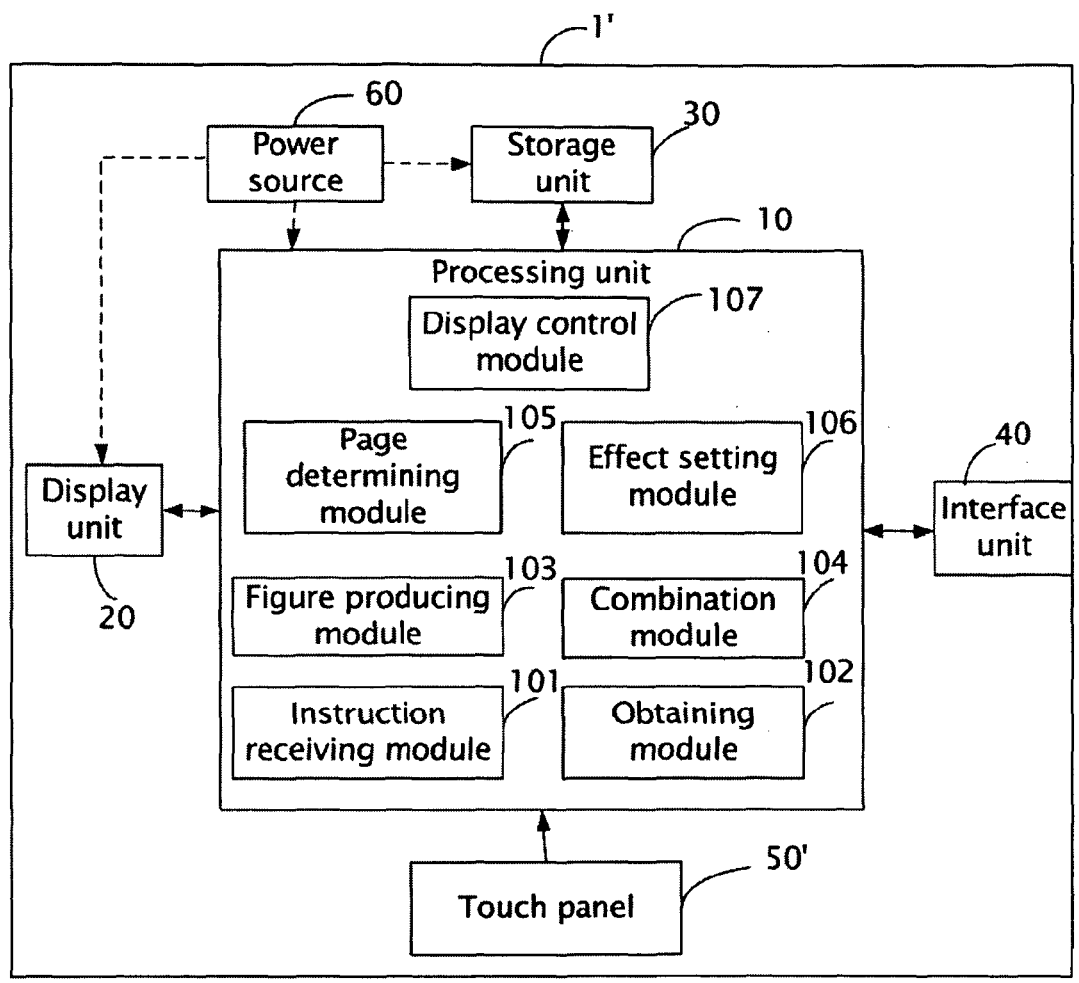
FIG. 5 is a block diagram of an electronic device capable of showing information with a page flip effect in another embodiment.

Referring to FIG. 5, the input unit 50' of an electronic device 1' in another exemplary embodiment is a touch panel 50'. The touch panel 50' includes a plurality of touch sensors (not shown), and the touch sensors can be capacitive touch sensors, resistive touch sensors, or the like.

When the user touches the touch panel 50' to input an flip-page instruction, the page determining module 105 determines the target page according to the movement direction of the user's touch, for example, if the movement direction is from left to right, then the touch panel 50' produces a previous page instruction, otherwise, the touch panel 50' produces a next page instruction. The movement direction is determined by the page determining module 105 according to a sequence of touch signals produced by the touch sensors.

After determining the target page, the obtaining module 102, the figure producing module 103, the combination module 104, and the display control module 107 execute the corresponding function as described in the exemplary embodiment, then the display control module 107 controls the display unit 20 to display the combined pages every the predetermined time interval in sequence, thus obtaining the page flip effect.

Figure 6:
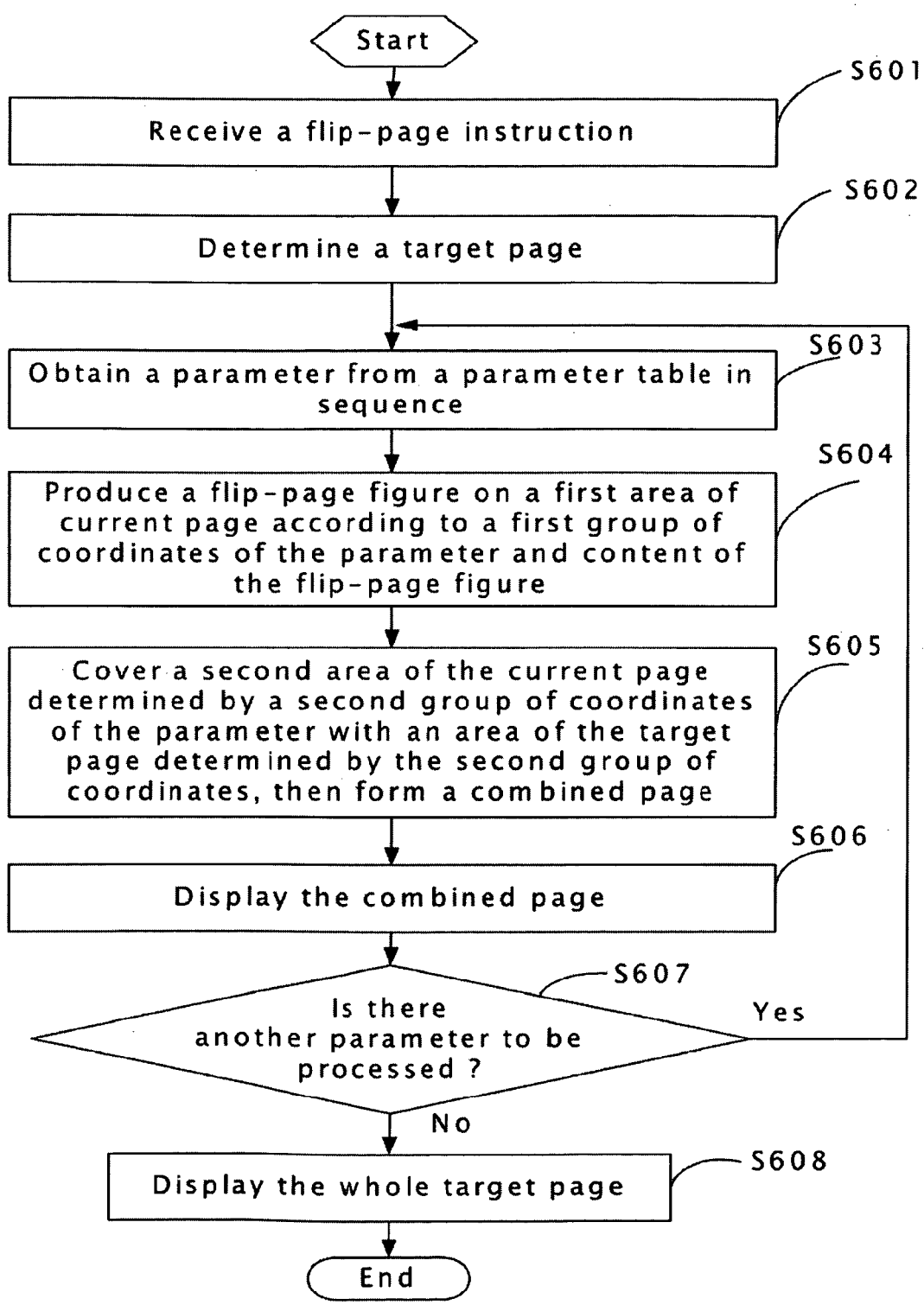
FIG. 6 is a flowchart illustrating a method for showing information in a page flip effect applied in the electronic device of FIG. 1 or FIG. 5 in accordance with an exemplary embodiment.

FIG. 6 is a flowchart illustrating a method for showing page flip effect applied in the electronic device 1/1' in an exemplary embodiment. In step S601, the instruction receiving module 101 receives a flip-page instruction generated by the input unit 50/50' in response to user operation.

In step S602, the page determining module 105 determines a target page according to the flip-page instruction, for example, if the flip-page instruction is a previous page instruction, then the page determining module 105 determines the target page is the previous page, if the flip-page instruction is a next page instruction, then the page determining module 105 determines the target page is the next page.

In step S603, the obtaining module 102 obtains a parameter from a parameter table in sequence. For example, if the previous obtained parameter is a second parameter of the parameter table, then the obtaining module 102 obtains a third parameter this time.

In step S604, the figure producing module 103 produces the flip-page figure on a first area of the current page according to the first group of parameters and the content of the flip-page figure. In detail, the figure producing module 103 determines the positioning points of the first area of the current page according to the first group of coordinates, and obtains the area of displaying the flip-page figure by connecting every two adjacent points, and adds the content to the obtained area, thus forming the flip-page figure.

In step S605, the combination module 104 covers a second area of the current page determined by the second group of coordinates with an second area of the target page also determined by the second group of coordinates, then forms a combined page;

In step S606, the display control module 107 controls the display unit 20 to display the combined page.

In step S607, the obtaining module 102 determines whether there is still another parameter to be processed after a combined page be displayed on the display unit 20.

If there is still another parameter to be processed, the procedure returns to step S603. Otherwise, in step S608, the display control module 107 controls the display unit 20 to display the whole target page when the predetermined time interval elapses.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. An electronic device capable of showing page flip effect, the electronic device comprising:
   an input unit configured to generate instructions in response to user operations;
   a storage unit configured to store electronic documents and a parameter table comprising a plurality of parameters, wherein each parameter comprises a first group of coordinates, content of a flip-page figure, and a second group of coordinates; the first group of coordinates is configured to determine a first area of a page, and the second group of coordinates is configured to determine a second area of the page;
   a display unit configured to display the electronic documents; and
   a processing unit comprising:
      an instruction receiving module configured to receive a flip-page instruction produced by the input unit;
      a page determining module configured to determine the target page according to the flip-page instruction;
      an obtaining module configured to obtain one of the parameters from the parameter table in sequence according to the flip-page instruction received by the instruction receiving module receives;
      a figure producing module configured to produce the flip-page figure on a first area of a current page according to the first group of coordinates and the content of the flip-page figure;
      a combination module configured to cover a second area of the current page determined by the second group of coordinates with a second area of the target page determined by the second group of coordinates to produce a combined page; and
      a display control module configured to control the display unit to display the combined page.

2. The electronic device of claim 1, wherein the obtaining module is further configured for determining whether there is another parameter to be processed, if there is another parameter to be processed, the obtaining module, the figure producing module, the combination module, and the display control module repeats the obtaining, producing, covering, and displaying processes; if all of the parameters have been processed, the display control module controls the display unit to display the whole target page.

3. The electronic device of claim 1, wherein the processing unit further comprises an effect setting module configured to set flipping effect information, the flipping effect information comprises content of the flip-page figure, the number of the parameters of a full process of flipping a page, a predetermined time interval of obtaining one of the parameters and displaying each combined page, and the number of coordinates associated with each parameter.

4. The electronic device of claim 3, wherein the content of the flip-page figure is selected from the group consisting of image, text, and blank.

5. The electronic device of claim 1, wherein the figure producing module is capable of determining positioning points of the first area of the current page according to the first group of coordinates, and obtaining the area of displaying the flip-page figure by connecting every two adjacent positioning points, and adding the content of the flip-page figure to the obtained area, thus forming the flip-page figure on the current page.

6. The electronic device of claim 1, wherein the input unit is a key board which comprises a page up key, a page down key, and other functional keys, the page determining module determines the target page according to the flip-page instruction is produced by the page up key or the page down key.

7. The electronic device of claim 1, wherein the input unit is a touch panel, the page determining module determines the target page according to the movement direction of user's touch.

8. The electronic device of claim 1, wherein the electronic device is selected from the group consisting of an e-reader, a mobile phone or a digital photo frame.

9. A method of an electronic device for showing page flip effect when the electronic device displays a change of electronic documents, the method comprising:
   receiving a flip-page instruction produced by an input unit;
   determining a target page according to the flip-page instruction;
   obtaining one of parameters in sequence, wherein each of the parameter comprises a first group of coordinates, content of a flip-page figure, and a second group of coordinates, the first group of coordinates is configured to determine a first area of a page, the second group of coordinates is configured to determine a second area of the page;
   producing a flip-page figure on a first area of current page according to the first group of coordinates and the content of the flip-page figure;
   covering a second area of the current page determined by the second group of coordinates with the second area of the target page determined by the second group of coordinates to form a combined page; and
   displaying the combined page.

10. The method of claim 9, further comprising:
determining whether there is still another parameter to be processed;
displaying the whole target page if all of the parameters have been processed;
returning to the step of obtaining one of parameters if there is still another parameter to be processed.

11. The method of claim 9, further comprising:
setting flipping effect information, the flipping effect information comprises content of the flip-page figure, the number of the parameter of a full process of flip a page, a predetermined time interval of obtaining each parameter and displaying each combined page, and the number of coordinates associated with each parameter;
storing the flipping effect information.

12. The method of claim 9, wherein the step of obtaining one of parameters in sequence comprises:
obtaining a parameter from the parameter table in sequence according to a previous obtained parameter.

13. The method of claim 9, wherein the step of producing a flip-page figure on a first area of current page according to the first group of coordinates and the content of the flip-page figure comprises:
determining the positioning points of the first area of the current page according to the first group of coordinates;
obtaining the area of displaying the flip-page figure by connecting every two adjacent positioning points, and adding the content of the flip-page figure to the obtained area.

* * * * *